United States Patent [19]

Mattila

[11] 4,186,604

[45] Feb. 5, 1980

[54] ELECTRONIC DIPSTICK

[76] Inventor: Alvin J. Mattila, 2 Beaver St., San Francisco, Calif. 94114

[21] Appl. No.: 941,950

[22] Filed: Sep. 13, 1978

[51] Int. Cl.$^2$ ...................... G01F 23/24; G01F 23/04
[52] U.S. Cl. ........................................ 73/295; 73/346; 338/28
[58] Field of Search .......... 73/295, 346, 347, 362 AR; 338/28, 29, 25, 13; 136/230; 33/126.7 R, 126.7 A; 340/622

[56] References Cited

U.S. PATENT DOCUMENTS

| 2,476,099 | 7/1949 | Knudson | 338/28 |
| 3,154,060 | 10/1964 | Hundere | 73/346 |
| 3,650,843 | 2/1968 | Kenyon | 136/230 |

OTHER PUBLICATIONS

"Build-It Book of Car Electronics" by Graf et al; 1975; pp. 49–57.

Primary Examiner—Gerald Goldberg
Assistant Examiner—Denis E. Corr
Attorney, Agent, or Firm—Thomas H. Olson

[57] ABSTRACT

A helically coiled strand forms a tubular body having an outer diameter adapted to fit in an existing dipstick channel in an internal combustion engine or like equipment having a sump defining container. The lower convolutions of the helical strand are expanded axially so as to afford unrestricted liquid movement between the strands. Within the axially expanded convolutions is supported a thermoelectric element such as a thermistor. One or more conductors for connecting the thermistor to external electronic circuitry extend through the center of the helically wound member, silicone rubber or the like being provided to support and insulate the conductor.

7 Claims, 3 Drawing Figures

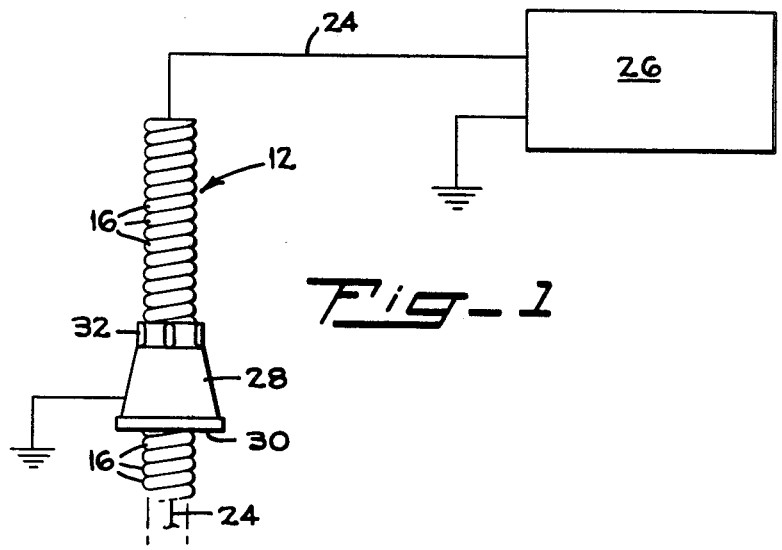
*Fig_1*
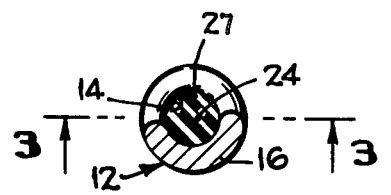
*Fig_2*
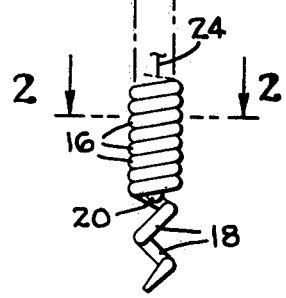
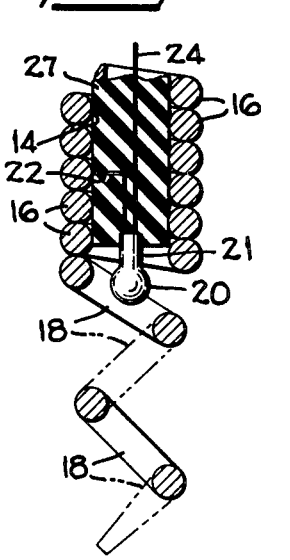
*Fig_3*

ELECTRONIC DIPSTICK

BACKGROUND OF THE INVENTION

1. Field of the Invention

This invention relates to an electronic dipstick and more particularly to such dipstick that supports a thermistor at a proper level and protects the thermistor from damage.

2. Description of the Prior Art

An electronic system for affording an indication of lubricant level in an internal combustion engine is disclosed in chapter seven of *Build-It Book of Car Electronics* by Graf and Whalen (Howard Sams, 1975). The oil level checker described in the cited reference includes a thermistor which is mounted on a conventional dipstick and there retained by heat shrinkable tubing which circumscribes both the dipstick and the thermistor. This technique of mounting the thermistor has certain disadvantages including exposure of the thermistor to damage by impact with parts of the equipment in which it is used and liability for the thermistor to move axially of the dipstick and therefore product inaccurate indications of oil level.

SUMMARY OF THE INVENTION

The present invention provides an elongate tubular member formed by a helically wound strand. The tubular member has an outer diameter corresponding to that of a dipstick so that a device incorporating the present invention can be retrofitted into existing engines and like equipment. The convolutions adjacent the inner or lower end of the elongate member are expanded axially so as to afford free liquid flow therethrough. Interior of the convolutions at the axially expanded portion is fixed a thermistor or like thermally sensitive electric element. The thermistor is entirely within the convolutions so that it is protected from physical damage. The thermistor is fixed with respect to the strand material so that the axial position of the thermoelectric element cannot be inadvertantly changed.

An object of the present invention is to provide an electronic dipstick wherein the thermoelectric element is protected from physical damage and from inadvertant movement. This object is achieved in accordance with the present invention because the strand material which is helically wound to form the elongate dipstick member has sufficient strength and because the axial opening defined thereby is sufficiently large to house the thermoelectric element therein.

Another object is to provide an electronic dipstick which affords free flow of the fluid adjacent the thermistor to assure accurate results. This object is achieved according to the present invention because the convolutions adjacent the lower or inner end of the dipstick body are expanded axially to form spaces between adjacent convolutions to facilitate such liquid flow.

A further object of the invention is to provide an electronic dipstick which can be retrofitted to virtually any internal combustion engine or like equipment that has a sump defining container associated therewith. This object is achieved because the elongate member has a sufficient degree of flexibility that it can be accommodated in virtually any existing equipment and because externally of the member is a stop which can be positioned at any desired location along the member in order that the thermoelectric element of the opposite end will reside at a level corresponding to the desired liquid level in the sump.

The foregoing together with the other objects, features and advantages will be more apparent after referring to the following specification and the accompanying drawing.

BRIEF DESCRIPTION OF THE DRAWINGS

FIG. 1 is an elevation view of an electronic dipstick incorporating the invention.

FIG. 2 is a cross-sectional view taken along line 2—2 of FIG. 1.

FIG. 3 is a fragmentary view at enlarged scale taken along line 3—3 of FIG. 2.

DESCRIPTION OF THE PREFERRED EMBODIMENT

Before describing the constructional and operational details of the present invention, a brief description of the circuitry disclosed in chapter seven of *Build-It Book of Car Electronics* will be given. Such circuit employs a thermistor as the active element. A thermistor is a device that can be heated by causing electric current to flow therethrough and that changes its resistance with temperature. In use as an oil level checker, the thermistor is supported at a level where it would be submerged in oil if the oil level is above some minimum point. When the thermistor is so submerged, application of current thereto which would tend to heat the thermistor will not significantly raise the temperature thereof because the heat will be dissipated in the oil. Consequently, the temperature will not rise and the resistance will not change. If on the other hand the oil level is below the thermistor, the temperature of the thermistor will rise in response to the flow of current therethrough, and the consequent change in resistance can be measured by the circuitry disclosed in the reference to indicate such condition. As disclosed in the reference, a thermistor is secured onto the surface of a conventional dipstick by means of a piece of heat shrinkable tubing. Because the thermistor protrudes from the surface of the dipstick it is subject to being dislodged from the desired position so as to provide inaccurate results.

Referring more particularly to the drawing reference numeral 12 generally indicates a dipstick embodying the present invention. The dipstick is formed into a substantially tubular shape by a strand of material such as steel wire of circular cross-sectional shape. The strand is helically wound to form interior thereof a central passage or opening 14. The convolutions 16 adjacent the upper end of the dipstick are tightly wound so that adjacent convolutions abut one another. At the opposite or lower end one or more convolutions 18 are axially stretched out or deformed so that the lower convolutions are axially spaced apart. Interior of passage 14 within expanded convolutions 18 a thermistor 20 is supported. The thermistor has a bulbous body from which an integral neck 21 extends. Two electrical leads extend from the neck, one lead 22 being soldered or welded to one of the convolutions 16 near the lower end of the dipstick. Such connection not only assists in physically supporting the themistor but establishes one electrical circuit connection thereto. There is another conductor 24 which extends interiorly of passage 14 and out of the top end of the elongate member. Conductor 24 is connected to an electrical circuit 26 which is exemplified as to structure and function by the circuit disclosed in the above cited reference.

As seen in FIG. 2 passage 14 in the region thereof defined by abutting convolution 16 is filled with a flexible insulative material 27, silicone rubber or the like serving well for such material. The material not only protects conductor 24 but imparts a degree of rigidity to the dipstick and excludes oil from passage 14. Moreover, the lower end of insulative material 27 envelops a portion of thermistor neck 21 to support the thermistor. It is preferred that at least one half of neck 21 protrude from the lower surface of insulative material 27 in order that the electrically active part of the thermistor which is housed in the bulbous portion thereof be exposed to oil or to air, as the case may be.

Secured exterior of the dipstick remote from spaced convolutions 18 is a stop member 28. The stop member has an abutment surface 30 for contacting a part of the sump defining container to limit the position of thermistor 20. The stop member also includes a crimpable collar 32 which can be crimped to secure or fix the stop member at any desired position along the dipstick.

In operation, stop member 28 is secured on the exterior of the dipstick at a location such that when abutment surface 30 contacts a part of the sump defining container, thermistor 20 is at the desired level. With the dipstick installed circuitry 26 can function as described in the above noted reference. The presence of material 27 interior of passage 14 both lends a degree of rigidity to the dipstick and protects conductor 24 against damage. Thermistor 20 is likewise protected against mechanical damage because it lies entirely interior of spaced-apart convolutions 18. Moreover, because the convolutions 18 are spaced apart, free fluid flow to thermistor 20 is afforded so that the output provided by circuit 26 is accurate at all times.

In retrofitting the present invention to an existing installation the dipstick provided with the equipment is first removed and laid alongside the dipstick 12. The relative position of the two dipsticks is established so that thermistor 20 is positioned in alignment with the "add oil" mark on the conventional dipstick. Then stop member 28 is moved axially until abutment 30 lines up with a corresponding stop member on the conventional dipstick. Then sleeve 32 is crimped to lock the stop member at such location. Dipstick 12 can then be installed in the same location from which the conventional dipstick was removed and operation of the device can proceed as described above.

In practice it has been found that an outer diameter of dipstick 12 of about $\frac{1}{4}$-$\frac{3}{8}$ inches suffices for most installations. Such device is large enough that passage 14 has an adequate extent to afford protection to thermistor 20 against mechanical damage. The outer diameter of such structure is receivable in most existing internal combustion engines and like equipment.

Although the dipstick described above is constructed of steel wire it will be obvious that other materials of suitable strength and elasticity can be employed. If non-conductive materials are employed, wire 22, rather than being soldered or welded to one of convolutions 16, is carried through passage 14 in parallelism with conductor 24 so that both of the conductors can be connected to circuit 26.

Although one embodiment has been shown and described it will be obvious that other adaptations and modifications can be made without departing from the true spirit and scope of the invention.

What is claimed is:

1. An improved dipstick for supporting a thermally sensitive electrical element at a prescribed level in a sump defining container comprising an elongate tubular member formed by a plurality of convolutions of helically wound strand, said member having a first end at which the convolutions axially abut one another and a second end remote from said first end at which the convolutions are spaced apart to afford liquid flow therebetween, an axially limited thermally sensitive electrical element supported interior of said convolutions adjacent said second end, said element being spaced apart from and thermally isolated from said convolutions with said element having direct exposure to liquid flow between said spaced apart convolutions electric circuit forming means including a conductor connected to said element and extending interiorly of said convolutions toward said first end, and stop means secured exteriorly of said tubular member adjacent said first end for limiting movement of said second end and said element inward of said sump defining container.

2. A dipstick according to claim 1 wherein said strand is conductive material and wherein said element is connected thereto so that said strand forms a part of said electric circuit forming means.

3. A dipstick according to claim 1 wherein the interior of said tubular member remote from said spaced apart convolutions is filled with silicone rubber or the like in circumscribing relation to said conductor.

4. A dipstick according to claim 3 wherein said element includes an integral neck and wherein said neck is partially imbedded in said silicone rubber.

5. A dipstick according to claim 1 wherein said stop means is adjustable along said tubular member and includes means for fixing said stop member at a desired location on said tubular member.

6. A dipstick according to claim 1 wherein said strand is constituted by metallic wire having a circular cross-sectional shape.

7. An improved dipstick for supporting a thermally sensitive electrical element at a prescribed level in a sump defining container comprising an elongate tubular member formed by a plurality of convolutions of helically wound strand, said member having a first end at which the convolutions axially abut one another and a second end remote from said first end at whlich the convolutions are spaced apart to afford liquid flow therebetween, the interior of said tubular member remote from said spaced apart convolutions being filled with silicone rubber or the like, an axially limited thermally sensitive electrical element supported interior of said convolution adjacent said second end, said element including an integral neck which is partially embedded in said silicone rubber so that the portion of said element remote from said neck resides interior of said convolutions adjacent said second end for direct exposure of said portion to liquid flowing between the spaced apart convolutions, electric circuit forming means including a conductor connected to said element and extending through said silicone rubber or the like interiorly of said convolutions toward said first end, and stop means secured exteriorly of said tubular member adjacent said first end for limiting movement of said second end and said element inward of said sump defining container.

* * * * *